(12) United States Patent
Zhou et al.

(10) Patent No.: US 11,372,184 B2
(45) Date of Patent: Jun. 28, 2022

(54) OPTICAL FIBER BOX

(71) Applicant: Suncall America Inc., Carrollton, TX (US)

(72) Inventors: Liang Zhou, Shenzhen (CN); Xiaohui Liu, Shenzhen (CN); Qiyue Wang, Shenzhen (CN); Masaya Nakagawa, Greer, SC (US)

(73) Assignee: SUNCALL AMERICA INC., Carrollton, TX (US)

( * ) Notice: Subject to any disclaimer, the term of this patent is extended or adjusted under 35 U.S.C. 154(b) by 0 days.

(21) Appl. No.: 17/124,149

(22) Filed: Dec. 16, 2020

(65) Prior Publication Data

US 2021/0181443 A1   Jun. 17, 2021

(51) Int. Cl.
*G02B 6/00* (2006.01)
*G02B 6/44* (2006.01)

(52) U.S. Cl.
CPC .................. *G02B 6/4446* (2013.01)

(58) Field of Classification Search
CPC .. G02B 6/4446; G02B 6/3885; G02B 6/3825; G02B 6/00
See application file for complete search history.

(56) References Cited

U.S. PATENT DOCUMENTS

| 5,101,463 | A | 3/1992 | Cubukciyan et al. |
| 6,994,580 | B1 | 2/2006 | Chen |
| 7,651,361 | B2 | 1/2010 | Henry et al. |
| 8,757,894 | B2 | 6/2014 | Katoh |
| 9,448,370 | B2 | 9/2016 | Xue et al. |
| 9,825,403 | B2 | 11/2017 | Martin et al. |
| 10,444,444 | B2 | 10/2019 | Ma et al. |
| 10,725,246 | B1* | 7/2020 | Liu ..................... G02B 6/3806 |
| 10,830,963 | B2 | 11/2020 | Elenbaas et al. |
| 2020/0150370 | A1* | 5/2020 | Van Baelen ......... G02B 6/4457 |
| 2021/0333479 | A1* | 10/2021 | Hill ..................... G02B 6/3849 |

FOREIGN PATENT DOCUMENTS

CN   210864140 U  *  6/2020  .......... G02B 6/4446

* cited by examiner

*Primary Examiner* — Jennifer Doan
(74) *Attorney, Agent, or Firm* — Suiter Swantz pc llo

(57) ABSTRACT

The present disclosure provides assemblies for supporting optical fiber connections. In embodiments, an optical fiber box includes a main body and a cover defining an installation cavity. A separator and a plurality of spacers are arranged in the main body and divide the installation cavity into first and second cavities and a plurality of installation channels for receiving optical fiber connectors of a type including a sleeve. Installation holes arranged at intervals along the length of the separator receive the sleeves. The plurality of installation channels and the plurality of installation holes are arranged in one-to-one correspondence. The optical fiber box optionally includes a shutter assembly at the entrance to each installation channel. In embodiments, at least the main body, the separator, and the plurality of spacers are integrally formed to provide a connection solution that does not require separate optical fiber adapters.

19 Claims, 11 Drawing Sheets

OPTICAL FIBER BOX

RELATED APPLICATION AND INCORPORATION BY REFERENCE

This patent application claims the benefit of priority of Chinese Application No. 201922268627.6 filed Dec. 17, 2019, the entirety of which is incorporated by reference herein.

TECHNICAL FIELD

The subject matter disclosed herein relates generally to assemblies for supporting optical fiber connections, and more particularly, to an optical fiber box including integral features forming a plurality of installation channels for receiving optical fiber connectors, thereby providing an optical fiber box having a reduced wall thickness and volume and obviating the need for separate optical fiber adapters.

BACKGROUND

Optical connections in high density installations are supported by assemblies for coupling optical fiber connectors. Conventional assemblies include a housing configured to receive and retain a plurality of optical fiber adapters manufactured separately from the housing. Conventional housings typically include a top, a bottom and opposing sides forming an interior compartment. In some instances, the top is removable to provide access to the interior compartment. The front of the housing is open to receive the fiber optic adapters in side-by-side relation, and features are provided in the housing to retain the received fiber optic adapters in place. External features may be provided on the housing to facilitate installation in a tray or rack.

Conventional assemblies including a separate housing and optical fiber adapters tend have a large wall thickness and a large volume, which result in unnecessary space occupation, low density in practical applications, and installation difficulties in narrow spaces. In addition, the separate housing and optical fiber adapters complicate manufacture, increase part count and require assembly, which increase manufacturing costs.

Therefore, what is needed is an integrated optical fiber connection solution.

BRIEF SUMMARY

According to a first aspect, the present disclosure provides an optical fiber box including a main body and a cover removably attached to the main body and defining an installation cavity with the main body. A separator is arranged in the installation cavity and has opposing ends respectively connected to two opposite side walls of the main body, and the separator is provided with a plurality of installation holes arranged at intervals. A plurality of spacers are arranged in the installation cavity at intervals defining a plurality of first installation channels, each of the plurality of spacers extending through the separator, and the plurality of first installation channels and the plurality of installation holes provided in one-to-one correspondence. A second installation channel is further arranged in the installation cavity and opens through a back end of the main body, with the main body forming a first portion of the second installation channel and the cover forming a second portion of second installation channel.

In some embodiments, the main body, the separator, and the plurality of spacers may be integrally formed.

In some embodiments, the separator may divide the installation cavity into a first cavity and a second cavity, wherein a first portion of each of the plurality of spacers is positioned in the first cavity and a second portion of each of the plurality of spacers is positioned in the second cavity.

In some embodiments, the optical fiber box may further include an optical fiber harness disposed in the first cavity including first optical fiber connectors each installed in one of the plurality of installation channels and received in a respective one of the installation holes, and a second optical fiber connector installed in the second installation channel.

In some embodiments, the first optical fiber connectors may each include a ferrule disposed in the first cavity and a sleeve received in a respective one of the installation holes, and wherein the second fiber optic connector is a multi-fiber connector.

In some embodiments, the cover includes a first cover covering the first cavity and a second cover covering second cavity, and wherein the optical fiber box further comprises a bottom cover covering an open bottom portion of the second cavity.

In some embodiments, the optical fiber box may further include a shutter assembly disposed in the second cavity proximate an entrance to each of the plurality of installation channels. In some embodiments, the shutter assembly includes a rotating shaft extending through an upper end of at least one of the plurality of spacers, an upper shutter rotatably connected to the rotating shaft, a lower shutter rotatably connected to the box body, a first biasing member biasing the upper shutter toward the closed condition, and a second biasing member biasing the lower shutter toward the closed condition, wherein the lower shutter engages the upper shutter in the closed condition of the shutter assembly.

In some embodiments, the lower shutter may include an optically transparent portion.

In some embodiments, the optical fiber box may further include a connecting member having opposing ends respectively connected to the two opposite side walls of the box body, wherein an upper end of each of the plurality of spacers is connected to the connecting member.

In some embodiments, the optical fiber box may further include a latch member disposed in the second installation channel including a first set of latches for retaining the latch member in the second installation channel, a second set of latches for retaining a multi-fiber connector disposed in the installation cavity, and a third set of latches for retaining a multi-fiber connector from outside of the optical fiber box.

In some embodiments, the optical fiber box may further include a plurality of second installation channels open through the back end of the main body.

According to another aspect, the present disclosure provides an integrally formed optical fiber box including a main body defining an installation cavity, a separator arranged in the installation cavity provided with a plurality of installation holes arranged at intervals, a plurality of spacers arranged in the installation cavity at intervals defining a plurality of first installation channels, each spacer extending through the separator, and the plurality of first installation channels and the plurality of installation holes provided in one-to-one correspondence, and a plurality of openings provided along the back of the main body defining a plurality of second installation channels.

According to another aspect, the present disclosure provides an optical fiber box including a main body, a cover attached to the main body and defining an installation cavity with the main body, a separator arranged in the installation cavity provided with a plurality of installation holes arranged at intervals, a plurality of spacers arranged in the installation cavity arranged at intervals defining a plurality of first installation channels, each of the plurality of spacers extending through the separator, and the plurality of first installation channels and the plurality of installation holes provided in one-to-one correspondence, a second installation channel arranged in the installation cavity and open through a back end of the main body, and an optical fiber harness disposed in the installation cavity, the optical fiber harness including first optical fiber connectors each installed in one of the plurality of installation channels and a second optical fiber connector installed in the second installation channel.

This brief summary is provided solely as an introduction to subject matter that is fully described in the detailed description and illustrated in the drawings. This brief summary should not be considered to describe essential features nor be used to determine the scope of the claims. Moreover, it is to be understood that both the foregoing summary and the following detailed description are exemplary and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In the drawings.

DETAILED DESCRIPTION

Figure 1:
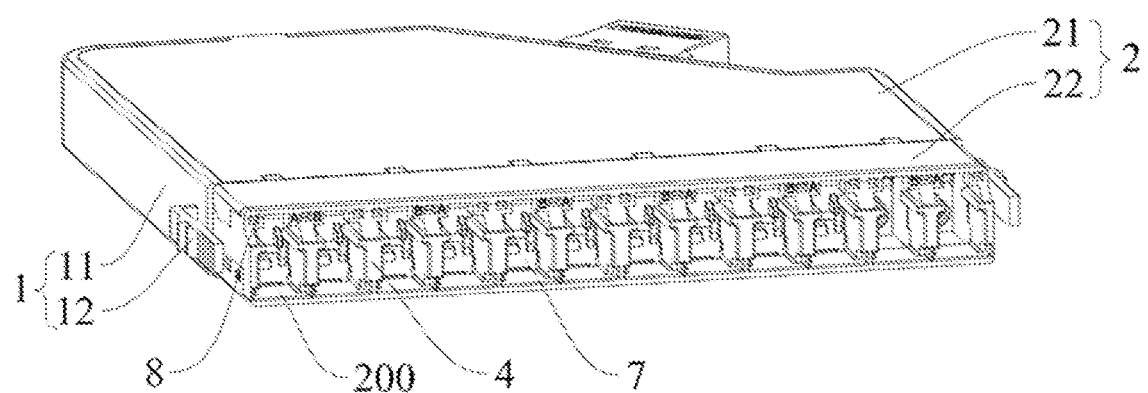
FIG. 1 shows an optical fiber box according to a specific embodiment of the present disclosure.

In the following disclosure, unless otherwise clearly specified and limited, the terms "connected," "coupled," "secured," and "attached" should be interpreted broadly. For example, such terms may refer to a fixed connection or a detachable connection, or integrated, a mechanical connection or an optical connection, directly connected or indirectly connected through an intermediate medium, or the internal communication of two components or an interaction relationship between two components. For those of ordinary skill in the art, the specific meaning of the above-mentioned terms in the present disclosure can be understood in specific circumstances.

In the following disclosure, unless otherwise clearly defined and limited, the first feature being "on" or "under" the second feature may include direct contact between the first and second features, or include contact via other features between the first and second features instead of direct contact. Moreover, the first feature being "on," "above," and "over" the second feature includes the first feature being directly above and obliquely above the second feature, or may mean that the level of the first feature is higher than that of the second feature. The first feature being "under," "below," and "beneath" the second feature includes the first feature being directly below and obliquely below the second feature, or may mean that the level of the first feature is lower than that of the second feature.

In the following disclosure, the terms "upper," "lower," "right," "left" and other orientations or positional relationships are based on the orientations or positional relationships shown in the drawings, and are only for ease of description and simplifying operations, rather than indicating or implying that the stated device or element must have a specific orientation or be constructed and operated in a specific orientation, and therefore, they cannot be understood as a limitation on the present description. In addition, the terms "first" and "second" are only used to distinguish components in description and have no special meaning.

Broadly speaking, the present disclosure describes embodiments of optical fiber boxes for enabling high density optical fiber connections.

With reference to FIGS. 1-4, an optical fiber box generally includes a box body 1, at least one box cover 2, a separator 3, a plurality of spacers 4, and at least one optical fiber connector 5. The box cover 2, which in some embodiments is implemented as a first cover 21 and a second cover 22, is removably secured on the box body 1 and defines an installation cavity 100 within the box body 1. The separator 3 is arranged in the installation cavity 100 such that two ends of the separator 3 are respectively connected to two opposite side walls of the box body 1, and the separator 3 is provided with a plurality of installation holes 32 arranged at intervals. The plurality of spacers 4 are also arranged at intervals such that each spacer 4 extends through the separator 3. The plurality of spacers 4 define a plurality of installation channels 200 in the installation cavity 100, and the plurality of installation channels 200 and the plurality of installation holes 32 are arranged in one-to-one correspondence. Each installation channel 200 includes a frontside portion for receiving a frontside optical fiber connector, and a backside portion for receiving a backside optical fiber connector. In some embodiments, frontside optical fiber connectors may be industry standard LC, SC or MU connectors, among others, while backside optical fiber connectors 5 may be according to the present disclosure as discussed further below. As shown, the optical fiber connector 5 according to the present disclosure removably installs in the backside portion of the installation channel 200 and extends through the installation hole 32 such that the ferruled portion is presented for optical coupling with a frontside connector to be installed.

The plurality of spacers 4 are connected to the separator 3 to form the plurality of installation channels 200 in the installation cavity 100, for example, as shown forming twelve installation channels 200 for accommodating twelve coupled pairs of optical fiber connectors on opposing sides of the separator 3. The separator 3 includes a transverse separator plate 31 having the plurality of installation holes 32 formed therethrough corresponding to the plurality of installation channels 200. In preferred embodiments, at least the box body 1, the separator 3, and the plurality of spacers 4 are integrally formed such that the installation holes 32 and the installation channels 200 serve to install the optical fiber connectors 5 without the need for a separate fiber optic adapter, thereby reducing the wall thickness and volume of the optical fiber box.

In some embodiments, the box body 1 includes a main body 11 having external mounting features 12 for facilitating mounting in a tray, chassis, rack, etc. In preferred embodiments, the box body 1 is one-piece construction. As shown, the external features 12 may be implemented as ear buckles configured for releasable engagement with a supporting structure. In some embodiments, the separator 3 divides the installation cavity 100 into a first cavity 101 and a second cavity 102, with the plurality of installation channels 200 opening through the forward end of the second cavity 200.

Figure 5:
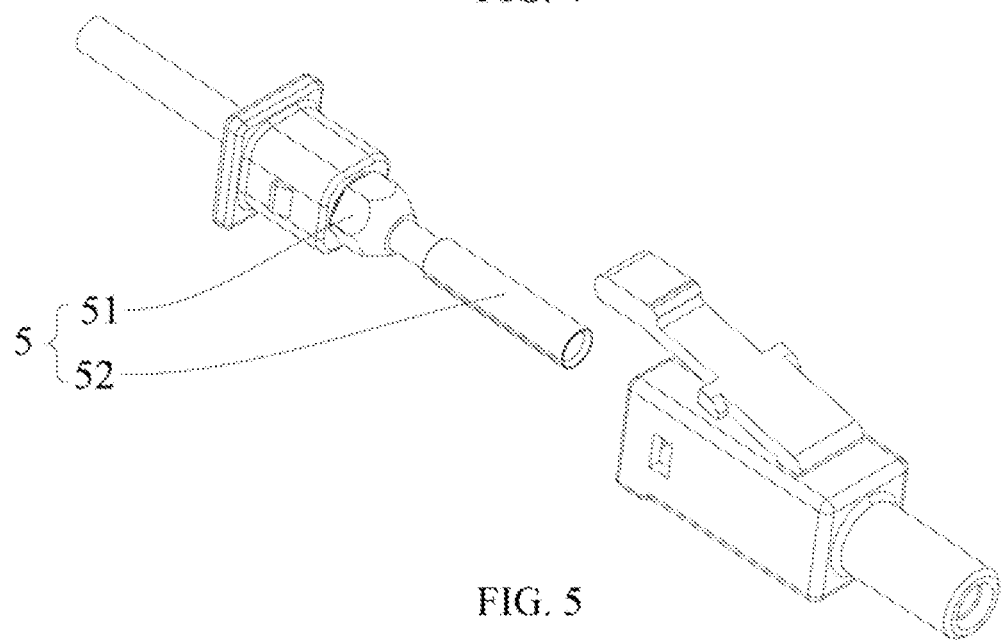
FIG. 5 shows an optical fiber connector according to a specific embodiment of the present disclosure.

With reference to FIG. 5, the optical fiber connector 5 generally includes a sleeve 52 and a ferrule 51. The ferrule 51 is disposed in the first cavity 101. The ferrule 51 has one end for inserting an optical fiber and an opposing end connected to the sleeve 52. The end of the sleeve 52 apart from the ferrule 51 is open to receive a ferrule of a mating outside optical fiber connector. Providing the sleeve 52 as part of the optical fiber connector 5, as opposed to providing the sleeve in a conventional fiber optic adapter, reduces the manufacturing difficulty of the optical fiber box. In addition, providing the sleeve 52 as part of the optical fiber connector 5 facilitates the mating connection between the optical fiber outside the optical fiber box and the optical fiber inside the optical fiber box, thereby further reducing the manufacturing cost of the optical fiber box. In addition, providing the sleeve 52 as part of the optical fiber connector 5 inside the optical fiber box reduces dust pollution at the contact area of the optical fibers, thereby increasing the transmission efficiency of the optical fibers and prolonging the service life of the optical fiber box.

Figure 2:
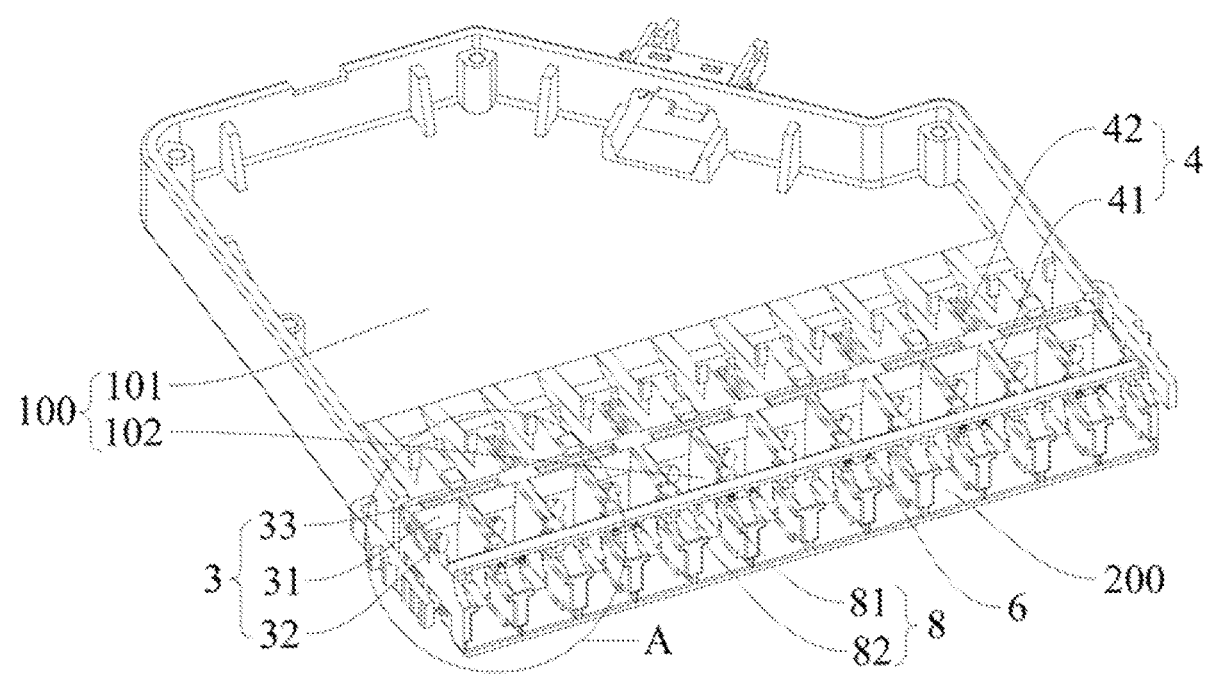
FIG. 2 shows box body according to a specific embodiment of the present disclosure.
Figure 3:
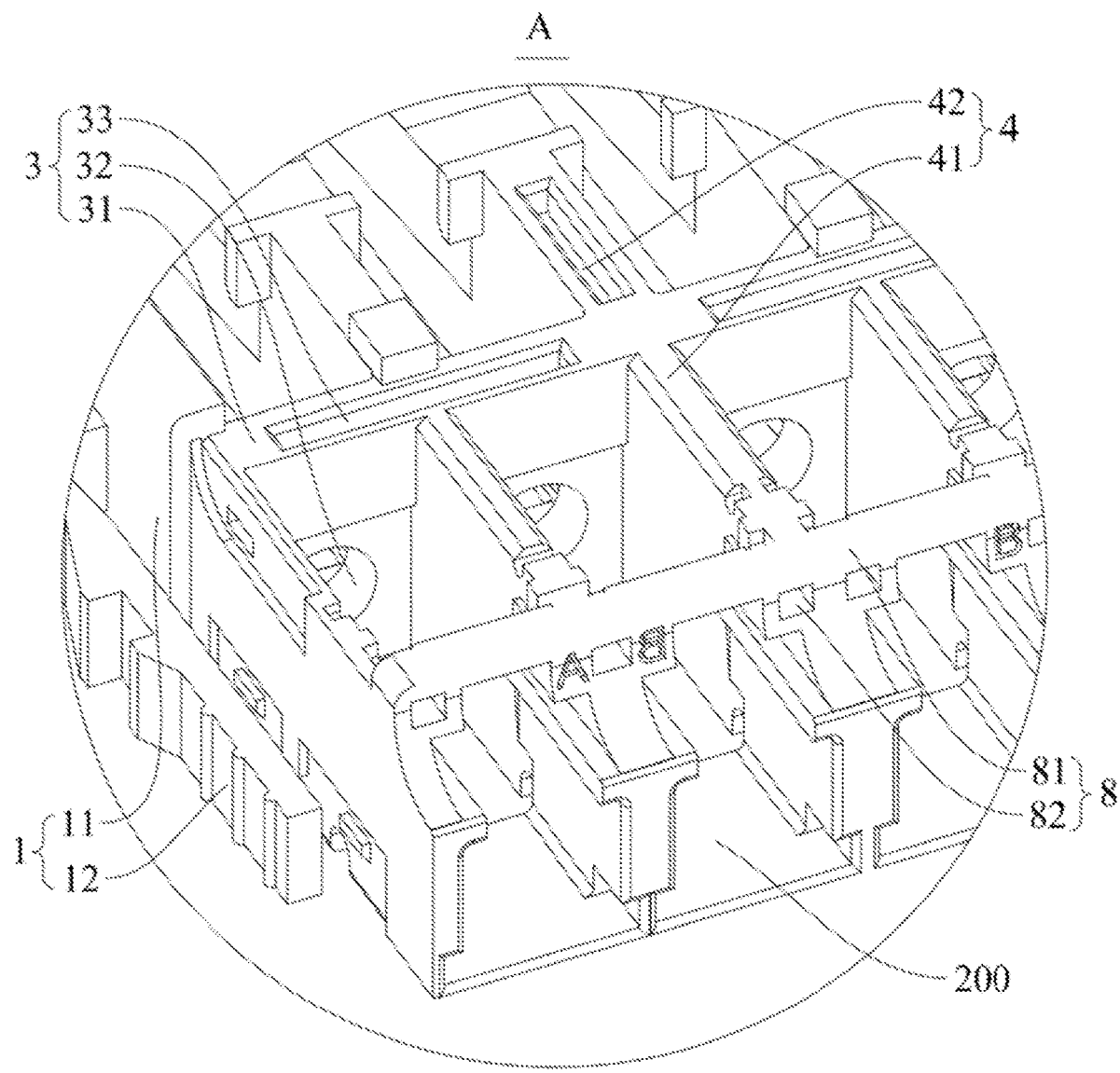
FIG. 3 shows a detailed view of part A in FIG. 2.
Figure 4:
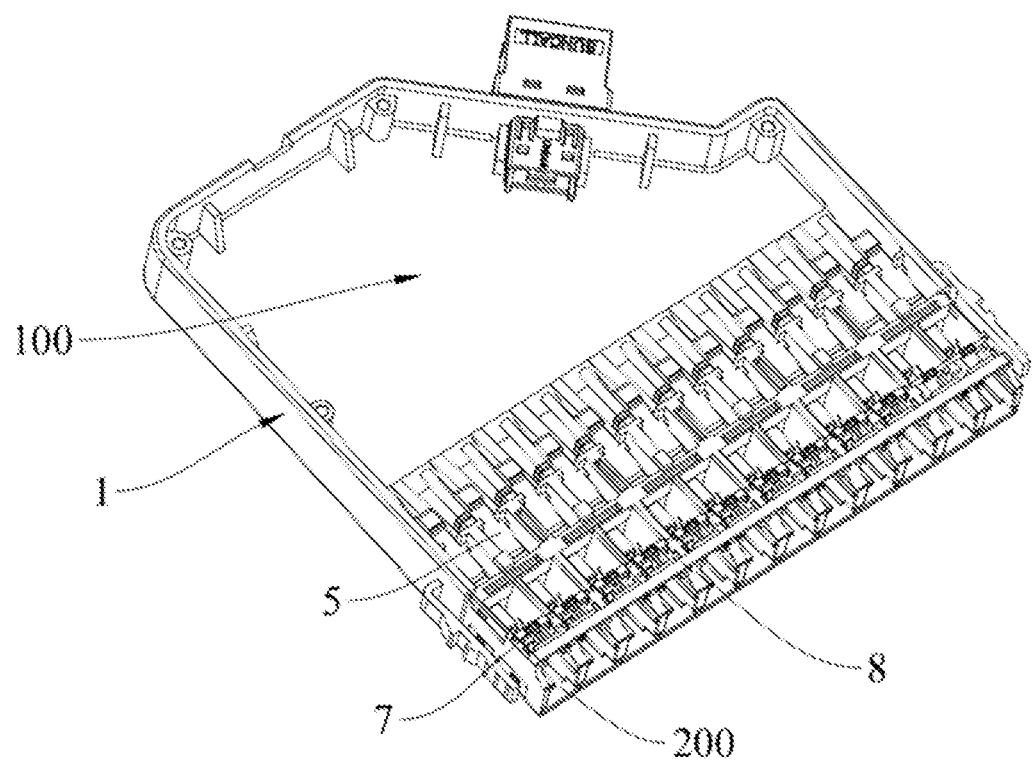
FIG. 4 shows a box body populated with optical fiber connectors according to a specific embodiment of the present disclosure.
Figure 6:
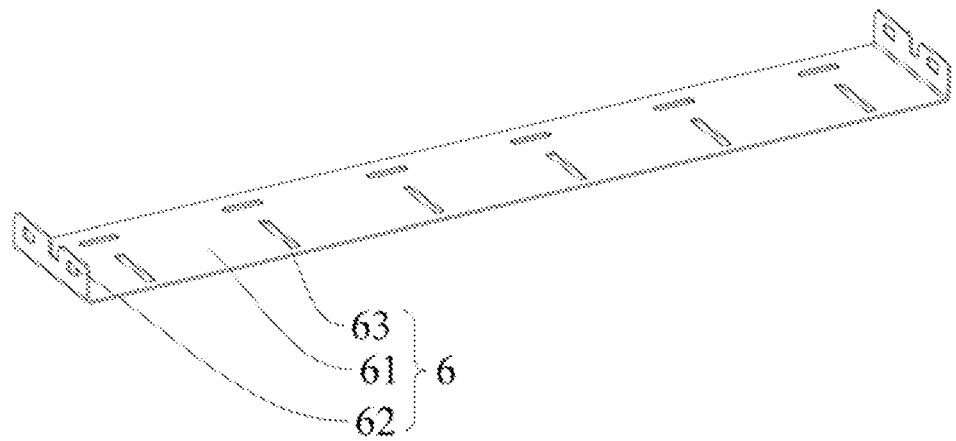
FIG. 6 shows a bottom cover according to a specific embodiment of the present disclosure.

With reference to FIGS. 2 and 6, in some embodiments, a portion of the bottom of the second cavity 102 in the formed box body 1 is open and is closable using a separate bottom cover 6 that removably attaches to the box body 1 to close the bottom of the second cavity 102. The opening of the bottom of the second cavity 102 facilitates the assembly of the box body 1, and in particular installation of optional shutters as discussed further below. In some embodiments, the bottom cover 6 includes a plate 61 having a plurality of first mating grooves 62 and a plurality of second mating grooves 63. The plurality of first mating grooves 62 are configured to engage with a plurality of corresponding first mating blocks formed on the opposing sides of the box body 1, and the plurality of second mating grooves 63 are configured to engage with corresponding second mating blocks formed on the bottom of the box body 1, for example on every other one of the plurality of spacers 4, such that the bottom cover 6 removably attaches to the box body 1 to close the bottom of the second cavity 102.

Figure 7:
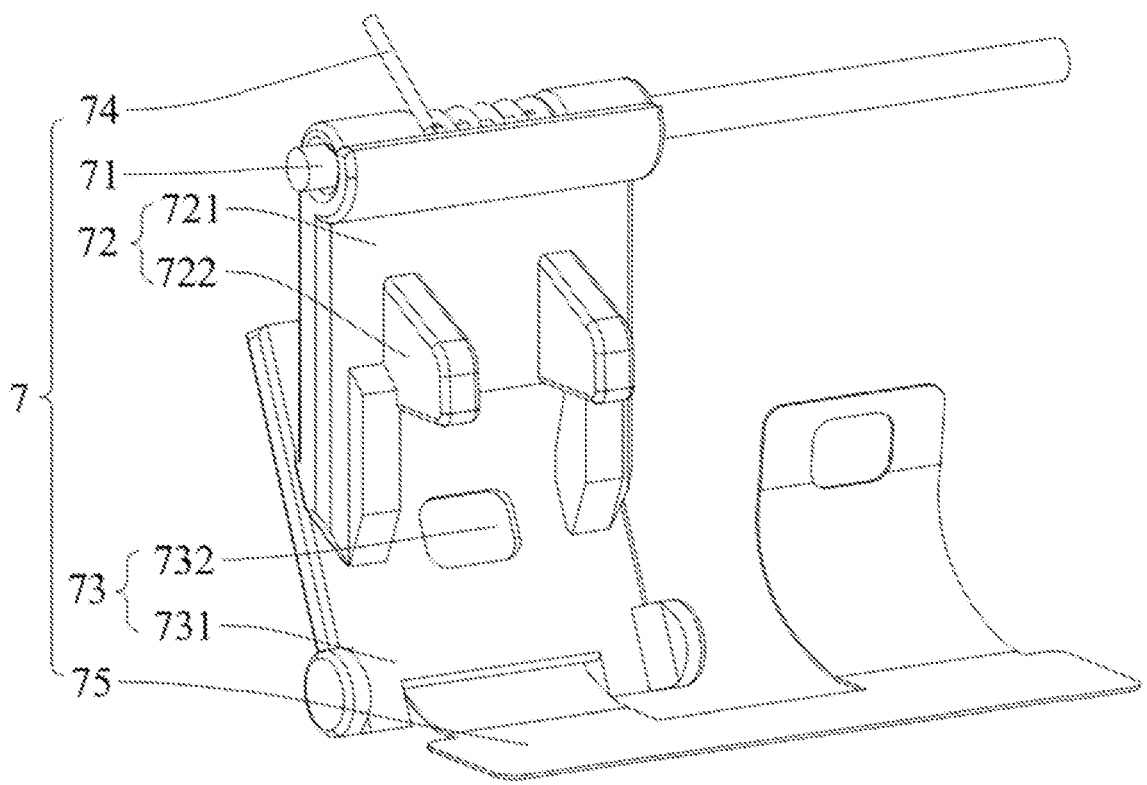
FIG. 7 shows a shutter assembly according to a specific embodiment of the present disclosure.

With reference to FIG. 7, a shutter assembly 7 may be disposed at the entrance of each installation channel 200. The shutter assembly 7 is rotatably connected to the spacer 4, and the shutter assembly 7 can close the installation channel 200 when the shutter assembly 7 is in a closed condition.

When an optical fiber located outside the separator 3 and an optical fiber located inside the separator 3 are in contact in the optical fiber connector 5, if no dustproofing measures are taken at the interface between the external optical fiber and the optical fiber box, dust will enter the inside of the optical fiber box through the outgoing interface and cause pollution to the internal environment of the optical fiber box, causing unnecessary performance loss to the optical fiber box. In order to avoid such undesirable phenomenon, a shutter assembly 7 is arranged between two adjacent spacers 4, and the shutter assembly 7 can reduce the external dust entering the optical fiber box, thereby prolonging the service life of the optical fiber box and improving the transmission efficiency of optical fibers.

The shutter assembly 7 generally includes a rotating shaft 71, an upper shutter member 72, and a lower shutter member 73. The rotating shaft 71 extends through the upper end of the spacer 4. The upper shutter member 72 is rotatably connected to the rotating shaft 71. The lower shutter member 73 is rotatably connected to the box body 1. When the shutter assembly 7 closes the installation channel 200, one end of the upper shutter member 72 abuts against the lower shutter member 73.

When there is no optical fiber to be inserted into the box body 1, one end of the upper shutter member 72 abuts against the lower shutter member 73 such that the entrance of the installation channel 200 is completely closed, reducing dust entering into the first cavity 101. When an optical fiber connector is inserted into the box body 1 from the outside of the box body 1 and along the installation channel 200, the optical fiber connector drives the upper shutter member 72 to rotate, and the upper shutter member 72 drives the lower shutter member 73 to rotate, such that a gap appears between the upper shutter member 72 and the lower shutter member 73 to allow the optical fiber connector to enter. When the optical fiber connector enters the sleeve 52, the upper shutter member 72 and the lower shutter member 73 engage the inserted optical fiber connector, which can greatly reduce the area of inlet between the inside and the outside of the box body 1, and greatly reduce the possibility that dust enters the inside of the box body 1 through the optical fiber entrance, thereby increasing the transmission efficiency of optical fibers and prolonging the service life of the optical fiber box.

In some embodiments, the shutter assembly 7 includes an upper elastic member 74 and a lower elastic member 75 which operate to bias the respective upper and lower shutter members 72, 73 toward the closed condition. A shown, the upper elastic member 74 is sleeved on the rotating shaft 71, and one end of the lower elastic member 75 abuts against the lower shutter member 73 while the other end abuts against the bottom of the box body 1 or against the bottom cover 6.

When no optical fiber connector extends through the shutter assembly 7, the upper shutter member 72 abuts against the lower shutter member 73 under the action of the upper elastic member 74, and the lower shutter member 73 is at the initial position under the action of the lower elastic member 75, such that the upper shutter member 72 can be engaged with the lower shutter member to close the entrance of the installation channel 200. When an optical fiber connector extends through the shutter assembly 7, the optical fiber connector drives the upper shutter member 72 to overcome the action of the upper elastic member 74 to rotate the upper shutter member 72 upward, and the upper shutter member 72 drives the lower shutter member 73 to overcome the action of the lower elastic member 75 to rotate the lower shutter member 73 downward, such that the upper shutter member 72 and the lower shutter member 73 separate to form a channel for the optical fiber to enter. As the optical fiber connector passes through the upper shutter member 72 and the lower shutter member 73 abut against the 'top' and 'bottom' of the optical fiber connector respectively under the action of the upper elastic member 74 and the lower elastic member 75, thereby reducing the area of inlet of the optical fiber entrance. As shown, the upper elastic member 74 is a torsion spring sleeved on the rotating shaft 71, and the lower elastic member 75 is an elastic slice having one end abutting against one side of the lower shutter member 73 away from the upper shutter member 72 and an opposing end connected with the bottom of the box body 1 or bottom cover 6.

With continued reference to FIG. 7, in some embodiments, two limiting blocks 722 are disposed on one side of the upper shutter member 72 away from the box body 1. It can be understood that the upper shutter member 72 includes an upper shutter plate 721 and two limiting blocks 722 arranged at an interval. When an optical fiber connector enters the box body 1 from the outside, the optical fiber can abut against the upper shutter plate 721 between the two limiting blocks 722, such that the optical fiber connector can be easily inserted from outside of the optical fiber box. In some embodiments, a recessed portion 732 is provided at a position where the lower shutter member 73 is not fitted with the upper shutter member 72, and the recessed portion 732 can transmit light. It can be understood that the lower shutter member 73 includes a lower shutter plate 731 and a recessed portion 732. Since the optical fiber in the optical fiber box is used to transmit light, when there is a problem with the optical fiber in a certain optical fiber connector 5, the brightness of the light transmitted therein will change. Through the recessed portion 732 with the light-transmitting effect, the change in the light transmitted inside each optical fiber connector 5 can be clearly observed, such that the operating condition of each optical fiber connector 5 can be intuitively determined.

Figure 8:
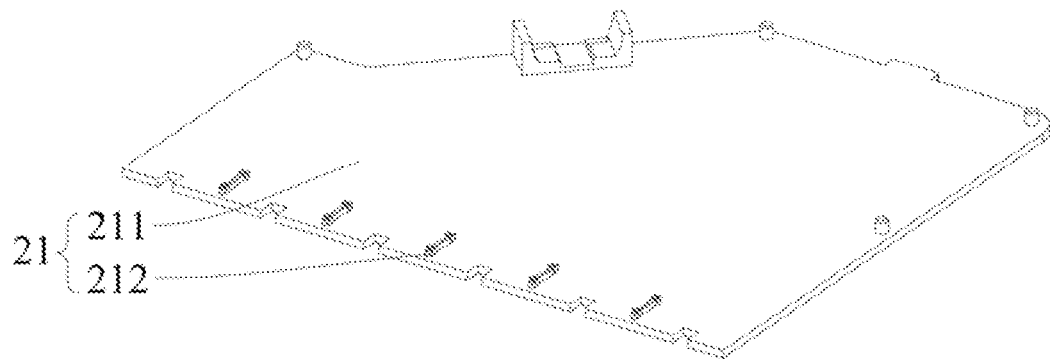
FIG. 8 shows a first cover according to a specific embodiment of the present disclosure.
Figure 9:
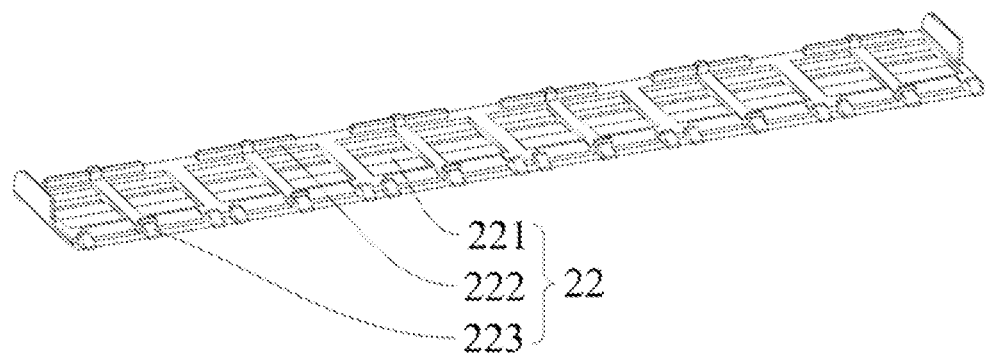
FIG. 9 shows a second cover according to a specific embodiment of the present disclosure.
Figure 10:
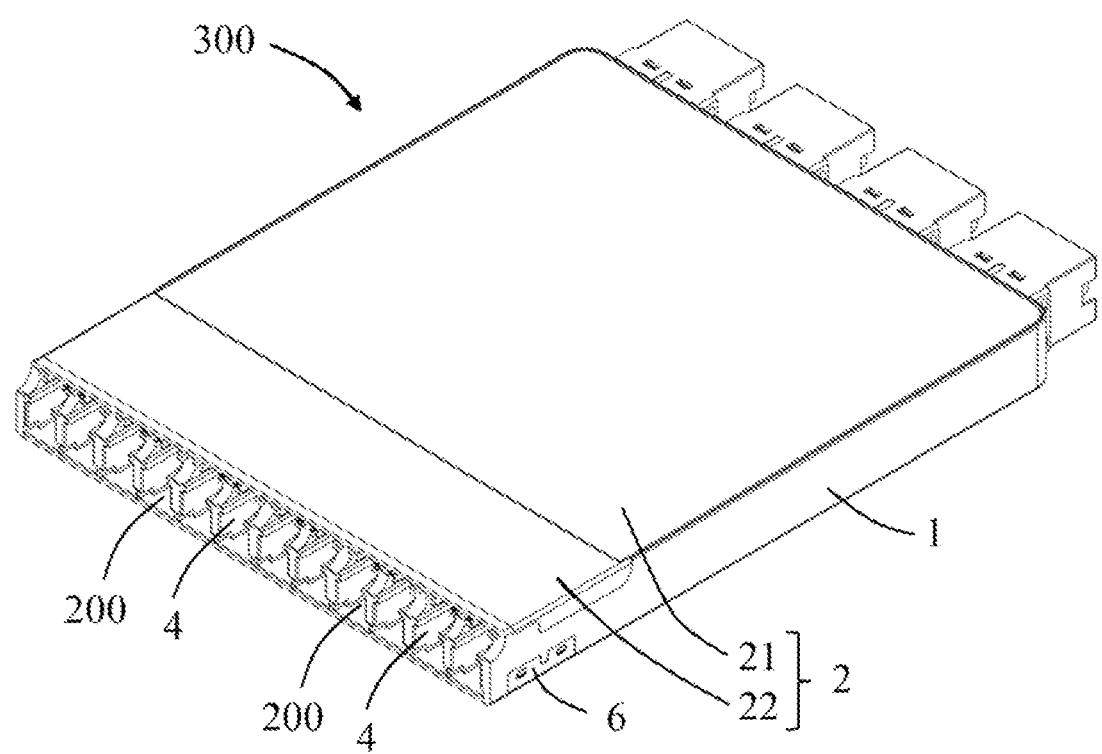
FIG. 10 shows an optical fiber box according to a specific embodiment of the present disclosure.

With reference to FIGS. 1, 8 and 9, in some embodiments, the box cover 2 includes a first box cover 21 and a second box cover 22, and one of the first box cover 21 and the spacers 4 are provided with a mating grooves 42, and the other is provided with mating protrusions 212 that engage with the mating grooves 42. One of the second box cover 22 and the separator 3 is provided with insertion protrusions 222, and the other one of the second box cover 22 and the separator 3 is provided with insertion grooves 33 that engage with the insertion protrusions 222. As shown, the first box cover 21 includes a first cover plate 211, generally dimensionally corresponding to the first cavity 101, and a plurality of mating protrusions 212, the second box cover 22 includes a second cover plate 221 and a plurality of insertion protrusions 222, the spacers 4 include a spacer plate 41 and a plurality of mating grooves 42 provided on the spacer plate 41 and fitted with the plurality of mating protrusions 212, and the separator 3 also includes a plurality of insertion grooves 33 provided on the separator plate 31 and fitted with the plurality of insertion protrusions 222. The aforementioned structures enable the first box cover 21 to be stably and detachably connected to the box body 1 and enables the second box cover 22 to be stably and detachably connected to the separator 3. In embodiments including shutter assemblies 7 according to the present disclosure, the removable second and bottom covers 22, 6 are required to facilitate installation of the upper and lower shutter members 72, 73 and associated supporting and biasing members.

With reference to FIGS. 1-3 and 9, the optical fiber box may further include a connecting member 8. The two ends of the connecting member 8 are respectively connected to two opposite side walls of the box body 1. The upper ends of the plurality of spacers 4 are all connected to the connecting member 8. The connecting member 8 is provided with a plurality of sockets 82, and the second cover 22 is provided with insertion blocks 223 corresponding to the plurality of sockets 82 one to one. Specifically, the connecting member 8 includes a connecting plate 81 and a plurality of sockets 82 provided on the connecting plate 81, and the second box cover 22 also includes insertion blocks 223 provided on the second cover plate 221 and arranged in one-to-one correspondence with the plurality of sockets 82. Through the mating between the plurality of insertion blocks 223 and the plurality of sockets 82, the function of the second box cover 22 closing the upper part of the second cavity 102 can be further enhanced, and the connection between the second box cover 22 and the box body 1 as well as the plurality of spacers 4 can be made more stable.

With reference to FIGS. 10-16, a second embodiment of an optical fiber box is shown at 300. Similar to the optical fiber box according to the first embodiment discussed above, the optical fiber box 300 generally includes a box body 1, a box cover 2 provided as a first cover 21 and a second cover 22, and a bottom cover 6, wherein each of the covers are independently removable to provide access to a predetermined portion of the installation cavity 100. In some embodiments, the first cover 21 is removable from the box body 1 to provide access to the first cavity 101 of the installation cavity 100 to access the optical fiber harness and connectors, and the second cover 22 and the bottom cover 6 are removable to access the second cavity 102 of the installation cavity 100 to install portions of the shutter assemblies 7 from above and below, for example shutter assemblies as discussed above.

Figure 11:
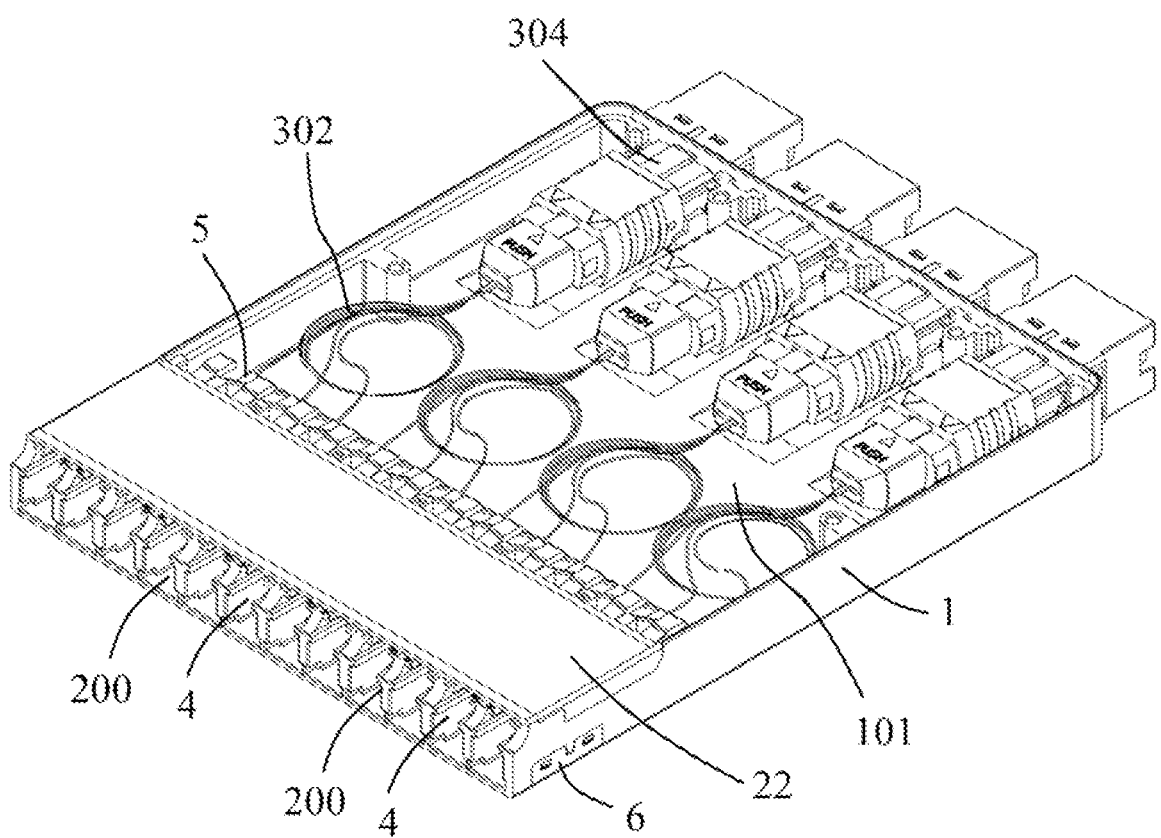
FIG. 11 shows an optical fiber box according to a specific embodiment of the present disclosure, with the first cover removed.
Figure 12:
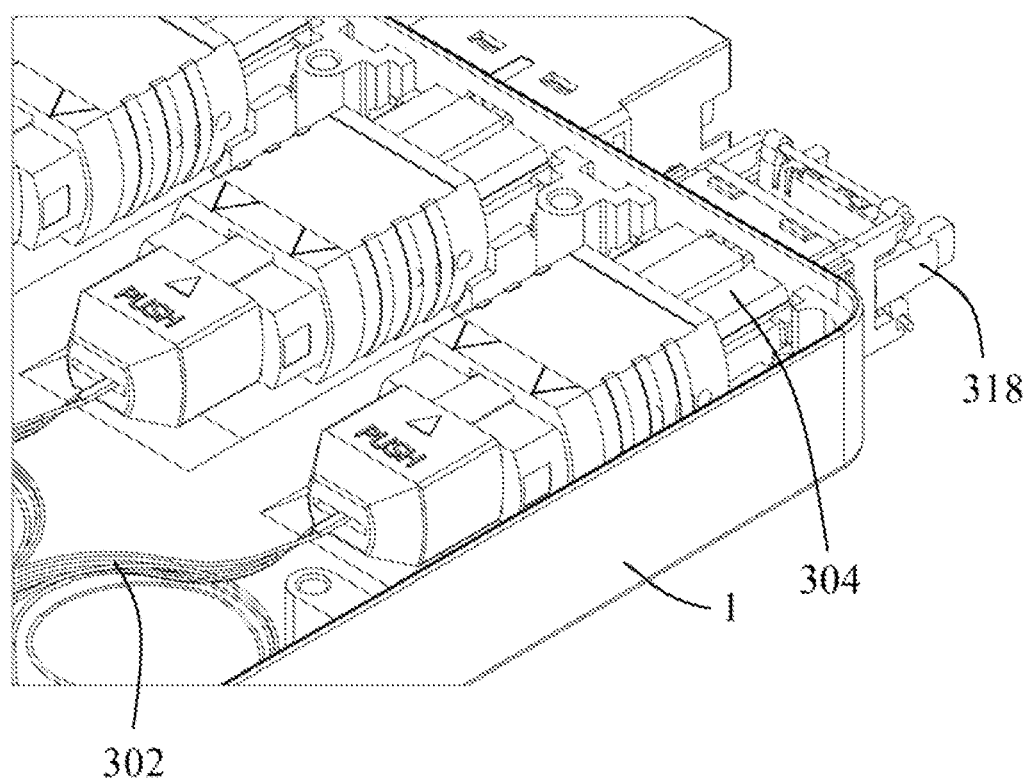
FIG. 12 shows a detailed view of part of FIG. 11.
Figure 13:
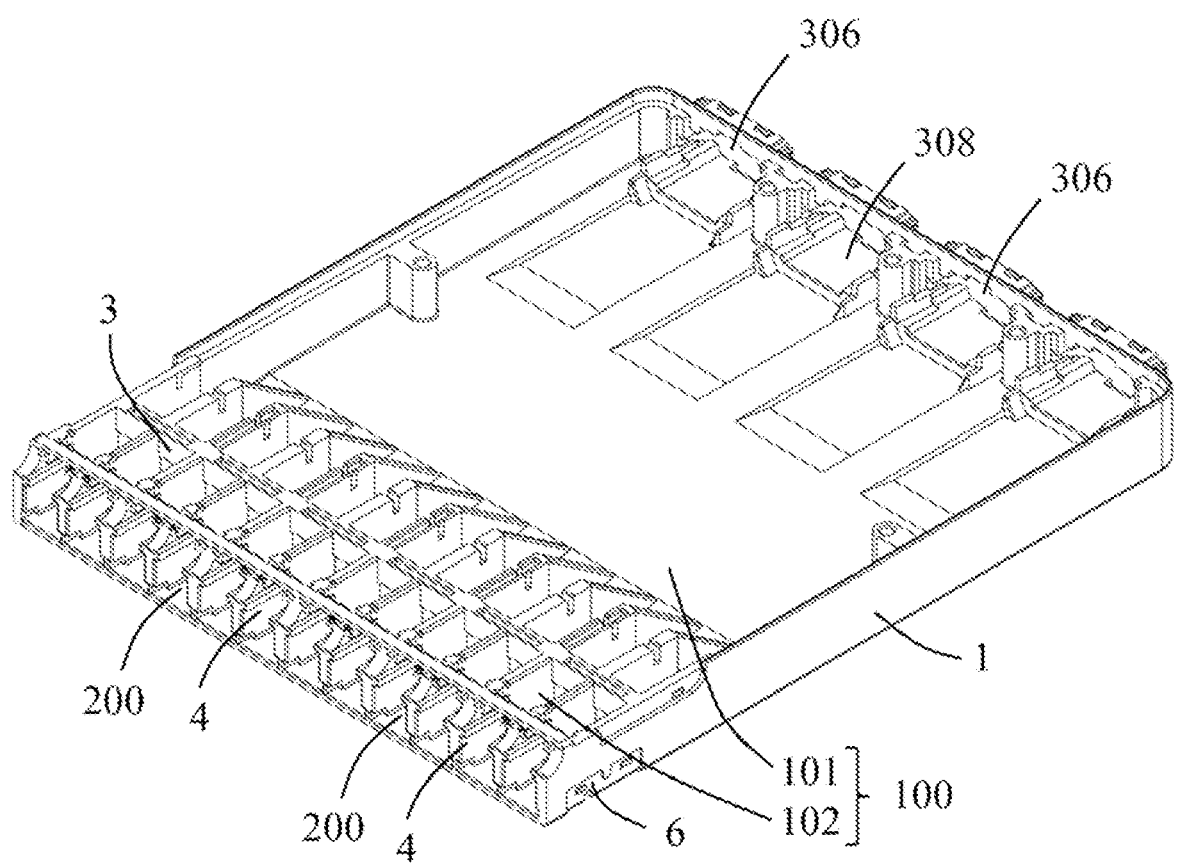
FIG. 13 shows a box body according to a specific embodiment of the present disclosure.

With specific reference to FIGS. 11 and 13, the optical fiber box 300 is configured with, for example, twelve installation channels 200 providing twelve optical connections in six A-B pairs. Each installation channel 200 is formed between two adjacent spacers 4 in the case of the inboard installation channels, or between one spacer 4 and one of the side walls of the box body 1 in the case of the installation channels positioned at the opposite ends. Each installation channel 200 is configured to receive a frontside optical fiber connector from outside the optical fiber box, and a backside optical fiber connector from within the optical fiber box. In some embodiments, one or more of the installation channels 200 may serve as a cable pass-thru. The separator 3 and the plurality of spacers 4 are integrally formed with the box body 1 such that the box body 1 as manufactured is configured to receive and optically connect the optical fibers connectors without requiring optical fiber adapters. Such construction reduces the optical fiber box wall thickness and overall volume as compared to conventional assemblies utilizing separate fiber optic adapters. For example, an optical fiber box according to the present disclosure, when configured for twelve LC connectors, may have a maximum height of about 9.4 mm, a maximum width of about 78.6 mm (excluding external mounting features), and a maximum length of about 94.4 mm, wherein the height and width are the dimensions general determinative of maximum connection density.

With specific reference to FIG. 11, the optical fiber box 300 may be configured with one or more individual cable harnesses 302 connectorized at both ends. As shown, four optical fiber harnesses 302 are included, wherein each cable harness includes four optical fibers, each cable harness is connectorized at one end with four single fiber connectors 5 each installed in one of the installation channels 200, and each cable harness is connectorized at the opposing end with a multifiber connector 304, such as an MPO connector wherein four of the available twelve fiber positions are utilized. This configuration allows for four separate cables coupled to the backside to be routed to four separate locations. Other configurations are envisioned including, but not limited to, a twelve-fiber harness with one single MPO backside connector.

With specific reference to FIG. 13, an integrally formed optical fiber box is shown including four second installation channels 306 provided along the back of the box body 1. Each second installation channel 306 includes an opening defined through a back of the box body 1 and projecting features 308 formed on the bottom of the main body, in the installation cavity, for receiving and guiding installation of the multi-fiber connector. In the case of MPO multi-fiber connectors, the features formed on the bottom of the box body 1 are shaped to generally correspond to the shape external shape of a portion of the MPO connector. Four second installation channels are shown for accommodating four MPO connectors inside the optical fiber box and four connectors from outside the optical fiber box. The first embodiment discussed above shows a single second installation channel provided on an angled back portion of the optical fiber box.

Figure 14:
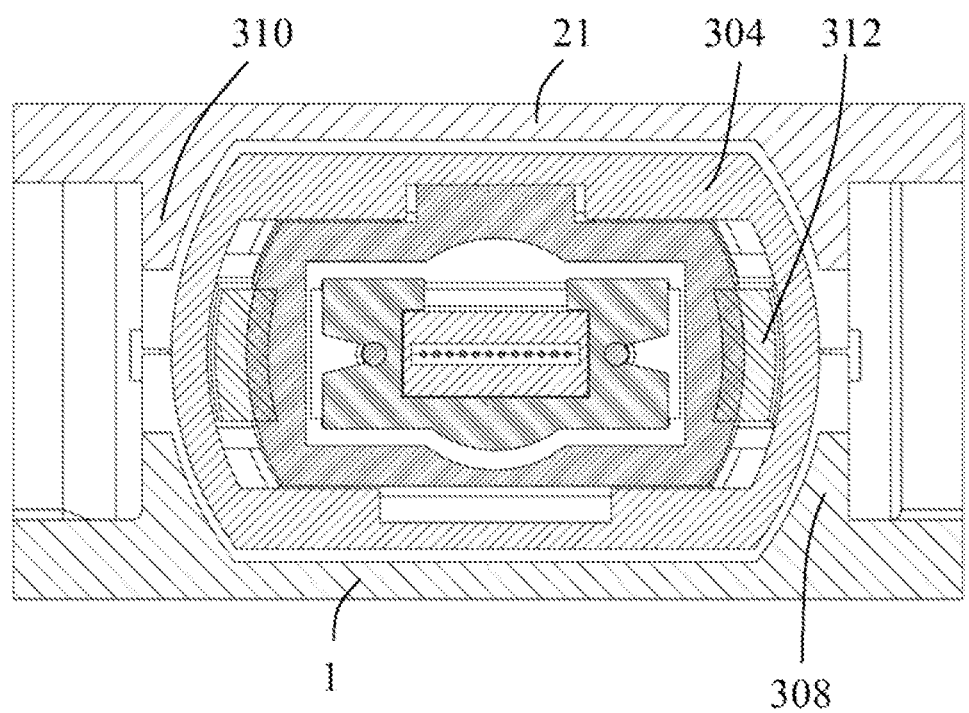
FIG. 14 shows a sectional view of part of the optical fiber box according to a specific embodiment of the present disclosure.
Figure 16:
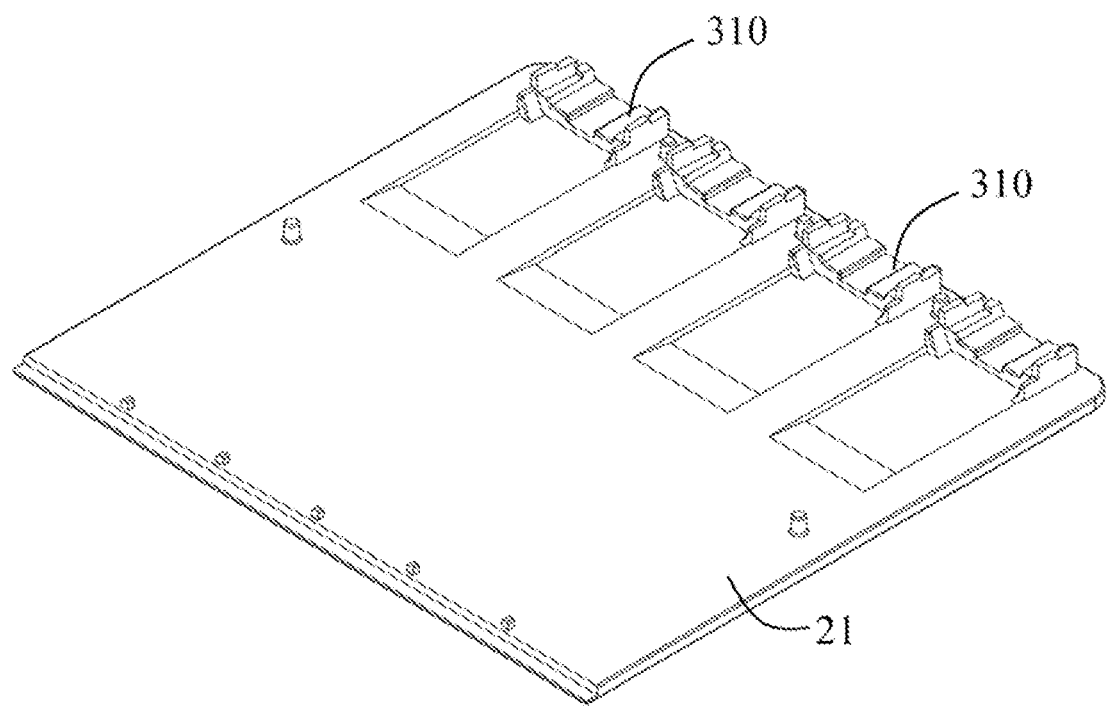
FIG. 16 shows a first cover according to a specific embodiment of the present disclosure.

With specific reference to FIG. 14, the MPO connector 304 is shown installed in the second installation channel and maintained between the first projecting feature 308 formed on the box body 1 and a like second projecting feature 310 formed on the cover 2, and specifically the first cover 21 enclosing the first cavity as shown with reference to FIG. 16. The first and second like projecting features 308, 310 are shaped to generally correspond to the connector.

Figure 15:
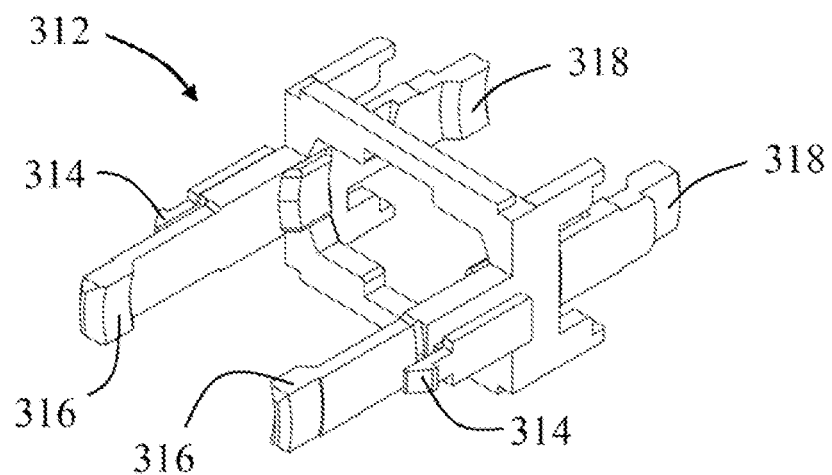
FIG. 15 shows a latching member according to a specific embodiment of the present disclosure.

With specific reference to FIG. 15, a latch member 312 functions to maintain the coupled multi-fiber connectors in the second installation channel. The latch member 312 may be a one-piece body generally including a first pair of spaced latches 314 configured to engage the box body 1 to maintain the latch member 312 to the box body 1. A second pair of spaced latches 316 releasably engage the opposing sides of the MPO connector inside the installation cavity. A third pair of spaced latches 318 releasably engage the opposing sides of the MPO connector from outside the optical fiber box.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. An optical fiber box, comprising:
   a main body;
   a cover removably attached to the main body and defining an installation cavity with the main body;
   a separator arranged in the installation cavity proximate a front end of the main body, opposing ends of the separator respectively connected to two opposite side walls of the main body, and the separator provided with a plurality of installation holes arranged at intervals;
   a plurality of spacers arranged in the installation cavity proximate the front end of the main body and arranged at intervals defining a plurality of first installation channels, each of the plurality of spacers extending through the separator, and the plurality of first installation channels and the plurality of installation holes provided in one-to-one correspondence; and
   a second installation channel arranged in the installation cavity and open through a back end of the main body, the main body forming a first portion of the second installation channel and the cover forming a second portion of second installation channel.

2. The optical fiber box according to claim 1, wherein the main body, the separator, and the plurality of spacers are integrally formed.

3. The optical fiber box according to claim 1, wherein the separator divides the installation cavity into a first cavity and a second cavity, and wherein a first portion of each of the plurality of spacers is positioned in the first cavity and a second portion of each of the plurality of spacers is positioned in the second cavity.

4. The optical fiber box according to claim 3, further comprising an optical fiber harness disposed in the first cavity, the optical fiber harness comprising first optical fiber connectors each installed in one of the plurality of installation channels and received in a respective one of the installation holes, and a second optical fiber connector installed in the second installation channel.

5. The optical fiber box according to claim 4, wherein the first optical fiber connectors each comprise a ferrule disposed in the first cavity and a sleeve received in a respective one of the installation holes, and wherein the second fiber optic connector is a multi-fiber connector.

6. The optical fiber box according to claim 3, wherein the cover comprises a first cover covering the first cavity and a second cover covering second cavity, and wherein the optical fiber box further comprises a bottom cover covering an open bottom portion of the second cavity.

7. The optical fiber box according to claim 6, further comprising a shutter assembly disposed in the second cavity proximate an entrance to each of the plurality of installation channels, the shutter assembly comprising:
   a rotating shaft extending through an upper end of at least one of the plurality of spacers;
   an upper shutter rotatably connected to the rotating shaft;
   a lower shutter rotatably connected to the box body;
   a first biasing member biasing the upper shutter toward a closed condition; and
   a second biasing member biasing the lower shutter toward the closed condition;
   wherein the lower shutter engages the upper shutter in the closed condition of the shutter assembly.

8. The optical fiber box according to claim 7, wherein the lower shutter comprises an optically transparent portion.

9. The optical fiber box according to claim 1, further comprising a connecting member having opposing ends respectively connected to the two opposite side walls of the box body, wherein an upper end of each of the plurality of spacers is connected to the connecting member.

10. The optical fiber box according to claim 1, further comprising a latch member disposed in the second installation channel, the latch member comprising:
   a first set of latches for retaining the latch member in the second installation channel;
   a second set of latches for retaining a multi-fiber connector disposed in the installation cavity; and
   a third set of latches for retaining a multi-fiber connector from outside of the optical fiber box.

11. The optical fiber box according to claim 1, further comprising a plurality of second installation channels open through the back end of the main body.

12. An integrally formed optical fiber box, comprising:
   a main body including a bottom, a back, and two opposite side walls defining an installation cavity;
   a separator arranged in the installation cavity provided with a plurality of installation holes arranged at intervals;
   a plurality of spacers arranged in the installation cavity arranged at intervals defining a plurality of first installation channels, each of the plurality of spacers extending through the separator, and the plurality of first installation channels and the plurality of installation holes provided in one-to-one correspondence; and
   a plurality of openings provided along the back of the main body defining a plurality of second installation channels;
   wherein a portion of each of the plurality of second installation channels is formed on the bottom of the main body inside the installation cavity.

13. The integrally formed optical fiber box according to claim 12, wherein the separator divides the installation cavity into a first cavity and a second cavity, and wherein a first portion of each of the plurality of spacers is positioned in the first cavity and a second portion of each of the plurality of spacers is positioned in the second cavity.

14. The integrally formed optical fiber box according to claim 12, further comprising a connecting member having opposing ends respectively connected to the two opposite side walls of the main body, and wherein an upper end of each of the plurality of spacers is connected to the connecting member.

15. An optical fiber box, comprising:
   a main body;
   a cover attached to the main body and defining an installation cavity with the main body;
   a separator arranged in the installation cavity provided with a plurality of installation holes arranged at intervals;
   a plurality of spacers arranged in the installation cavity arranged at intervals defining a plurality of first installation channels, each of the plurality of spacers extending through the separator, and the plurality of first installation channels and the plurality of installation holes provided in one-to-one correspondence;
   a second installation channel arranged in the installation cavity and open through a back end of the main body; and
   an optical fiber harness disposed in the installation cavity, the optical fiber harness comprising first optical fiber connectors each installed in one of the plurality of installation channels and a second optical fiber connector installed in the second installation channel.

16. The optical fiber box according to claim 15, wherein the main body, the separator, and the plurality of spacers are integrally formed, and wherein the separator divides the installation cavity into a first cavity and a second cavity, and wherein a first portion of each of the plurality of spacers is positioned in the first cavity and a second portion of each of the plurality of spacers is positioned in the second cavity.

17. The optical fiber box according to claim 16, wherein the first optical fiber connectors each comprise a ferrule disposed in the first cavity and a sleeve received in a respective one of the installation holes, and wherein the second fiber optic connector is a multi-fiber connector.

18. The optical fiber box according to claim 15, further comprising a shutter assembly disposed in the second cavity proximate an entrance to each of the plurality of installation channels, the shutter assembly comprising:
   a rotating shaft extending through an upper end of at least one of the plurality of spacers;
   an upper shutter rotatably connected to the rotating shaft;
   a lower shutter rotatably connected to the box body;
   a first biasing member biasing the upper shutter toward a closed condition; and
   a second biasing member biasing the lower shutter toward the closed condition;
   wherein the lower shutter engages the upper shutter in the closed condition of the shutter assembly.

19. The optical fiber box according to claim 15, further comprising a latch member disposed in the second installation channel, the latch member comprising:
   a first set of latches for retaining the latch member in the second installation channel;
   a second set of latches for retaining the second optical fiber connector; and
   a third set of latches for retaining a multi-fiber connector from outside of the optical fiber box.

* * * * *